United States Patent Office 3,080,337
Patented Mar. 5, 1963

3,080,337
NOVEL TRIPOLYMERS OF ISOBUTYLENE, A CYCLODIENE, AND ISOPRENE
Leon Sherwood Minckler, Jr., Metuchen, Delmer L. Cottle, Highland Park, and Theodore Lemiszka, Rahway, N.J., assignors to Esso Research and Engineering Company, a corporation of Delaware
No Drawing. Filed Nov. 12, 1958, Ser. No. 773,147
13 Claims. (Cl. 260—45.5)

This invention relates to hydrocarbon polymers and more particularly relates to tripolymers of a cyclodiene, isobutylene and isoprene.

Copolymers of a cyclodiene and isobutylene have been prepared previously by a low temperature technique utilizing an active Friedel-Crafts catalyst such as aluminum chloride. These copolymers have very good physical properties when vulcanized as well as very good ozone resistance. The process for the preparation of these copolymers is described in U.S. Patent 2,577,822 which is incorporated in the present application by reference. However, the copolymerization reaction described therein when using a $C_5$ cyclodiene is complicated by certain undesirable effects namely (a) the formation of gel or unwanted cross-linked copolymers and (b) difficulty in reaction control leading to extreme reactor fouling.

It has now been found surprisingly that when the polymerization reaction between a cyclodiene and isobutylene is carried out with small amounts of isoprene present the formation of gel or cross-linked polymers is inhibited, excellent reaction control is obtained resulting in little or no reactor fouling and as an additional surprising benefit, the tripolymers produced by the reaction can be vulcanized to vulcanizates having outstanding physical properties and extreme resistance to ozone attack.

The cyclodienes utilized as a component of the copolymers of the invention are conjugated $C_5$ to $C_6$ cyclodienes, preferably cyclopentadiene. Other $C_5$ to $C_6$ cyclodienes can be used, however, such as methylcyclopentadiene, ethylcyclopentadiene, conjugated cyclohexadiene and methyl or ethyl substituted cyclohexadiene.

The reaction is carried out according to the process described in U.S. Patent 2,577,822 except that small quantities of isoprene are present in the polymerization reaction mixture. For purposes of completeness, a description of the polymerization reaction is included herein.

From 0.1 to 25, preferably from 0.2 to 5 parts by weight of a cyclodiene and from 0.1 to 25, preferably from 0.5 to 5 parts of isoprene are mixed with 99.8 to 50 parts by weight of isobutylene and the resulting mixture cooled to a polymerization temperature between −150° C. and +50° C., preferably −100° C. to −50° C. It is also desirable to dilute the reactants with a low freezing non-polymerizable diluent such as the various mono or poly halogenated alkanes such as methylchloride, ethylidene difluoride, or a $C_2$ to $C_5$ aliphatic hydrocarbon or carbon disulfide, or the like. The diluent must be liquid at the polymerization temperature and non-reactive in the presence of the polymerization catalyst. Usually about 50 to 500 parts of diluent are added per 100 parts of isobutylene.

The above cold solution is then polymerized by the addition of a Friedel-Crafts catalyst, such as aluminum chloride in a low-freezing, non-complex forming solvent such as methyl or ethyl chloride or carbon disulfide. This solvent can be the same as or different from the diluent present in the reaction mixture. The concentration of the catalyst solution is in the range of about 0.05 to 10 wt. percent, usually between 0.1 to 2 wt. percent. Generally from about 0.1 to 3.0 g. of Friedel-Crafts catalyst is required per 100 g. of tripolymer product.

The polymerization reaction takes place after a short induction period and can be carried out either in a succession of batch reactions or in a continuous reaction. The polymerization reaction is allowed to proceed until from 30 to 100% conversion, preferably 60 to 80% conversion is obtained based on the monomers. The reaction is stopped by quenching the reaction mixture with a $C_1$ to $C_5$ alkanol or other suitable catalyst poison such as water, acetic acid, etc. Alternatively and preferably, the reaction is stopped by discharging the polymerization reaction mixture when the desired percent conversion is attained into a flash tank containing warm water which kills the catalyst, volatilizes out the unpolymerized monomers and the diluent if used, and converts the copolymer product into a warm water slurry. Various slurry stabilizers and polymer stabilizers such as zinc stearate, calcium stearate, phenyl-beta-naphthylamine, N-lauroyl-p-aminophenol, 2,6-ditertiarybutyl-p-cresol, dicyclohexylamine stearate and 2,2-methylene-bis(4-methyl-6-tertiary-butyl phenol) can be added to the flash tank. The tripolymer is then recovered by a filtering operation followed by drying.

Should the molecular weight of the isolated tripolymer be higher than desired, the tripolymer is plasticized by hot milling. In particular, the tripolymer is milled at temperatures of 38 to 205° C., preferably 93 to 149° C. for from about 1 to 30 minutes, preferably from 5 to 10 minutes to reduce the molecular weight of the tripolymer for ease of processing. A rubber mill or other conventional rubber compounding equipment can be employed. Plasticization is retarded by the presence of antioxidants and carbon black and accordingly, the addition of these compounds should not take place until the plasticization step is carried out.

It has also been discovered that the addition of as little as one part per hundred by weight of the tripolymer of the invention in butyl rubber (GR–I) acts as an effective plasticizing agent to reduce the Mooney viscosity and molecular weight of butyl rubber. In general, the tripolymer of the invention and butyl rubber can be milled together in any proportions, but from 1 to 50, preferably from 1 to 25 parts by weight of tripolymer are advantageously used based on the butyl rubber. The butyl rubber and tripolymer are milled together at temperatures of 38 to 205° C., preferably 93 to 149° C. for from about 1 to 30 minutes, preferably from 5 to 10 minutes. Butyl rubber is a copolymer of isobutylene with a conjugated diolefin such as isoprene, butadiene, dimethylbutadiene, piperylene, etc. The preparation and uses of butyl rubber are described in U.S. Patent 2,356,128 to Thomas et al.

The tripolymer as isolated from the reaction mixture or after plasticization can be stabilized by the addition of antioxidants, such as those generally employed in the rubber art, as for example:

Phenyl-beta-naphthylamine
N-lauroyl-p-aminophenol
2,6-ditertiarybutyl-p-cresol
Dicyclohexylamine stearate
2,2-methylene-bis(4-methyl-6-tertiarybutyl phenol)

In general, from 0.1 to 5 wt. percent, preferably 0.1 to 1 wt. percent of antioxidant is used based on the tripolymer. These antioxidants are generally added by dry milling or other mixing operations. However, the antioxidant is preferably added when the freshly prepared polymer is slurried.

The polymer can be vulcanized with sulfur, especially in the presence of conventional vulcanization accelerators. Suitable accelerators include low molecular weight alkyl thiuram disulfides such as tetramethylthiuram disulfide, mercaptobenzothiazole, benzothiazyl disulfide, N-cyclohexyl-2-benzothiazole sulfenamide and the like. Other types of accelerators used for curing isobutylene copolymers of the butyl type (e.g. 97% by weight of isobutylene and 3% by weight of isoprene) are also suitable. Carbon black, zinc oxide or other pigments or fillers as well as plasticizers of the hydrocarbon type or of the ester type, and other conventional compounding ingredients may also be present. Oils that are essentially hydrocarbon in nature, such as mineral oils, can be added to extend the copolymers. In general, from 5 to 50 wt. percent of oil based on the tripolymer is employed. A typical compounding recipe can consist of the following.

| Component: | Parts by weight |
|---|---|
| Tripolymer | 100 |
| Zinc oxide | 0 to 10, preferably 3 to 8. |
| Sulfur | 0.1 to 5, preferably 0.5 to 2. |
| Accelerator | 0.1 to 5, preferably 0.5 to 2. |
| Carbon black | 0 to 150, preferably 25 to 75. |

Vulcanization is obtained by heating the compound in a known manner, e.g. for 5 to 60 minutes at about 100 to 200° C., preferably 140 to 160° C.

Alternatively, it is possible to omit the sulfur and accelerator and to vulcanize the polymer with the aid of p-quinone dioxime or the like as described in U.S. Patent 2,393,321; or vulcanization can be effected with the aid of a dinitroso-compound such as para- or meta-dinitrosobenzene.

When vulcanized, the polymer is rubber-like, elastic and in general, resembles ordinary butyl type rubber. The vulcanized tripolymers of the invention can be used wherever a good synthetic rubber is desired, particularly in those applications requiring high ozone resistance such as tire curing bags. Additionally, these tripolymers can be blended with butyl rubber in all proportion to improve the ozone resistance of butyl rubber, and the degree of improvement in ozone resistance is a function of the amount of tripolymer in the blend. In general, from 5 to 50 wt. percent tripolymer in the blend is preferred.

The invention will be better understood from the following examples. When the term "parts" is used herein it is to be understood to refer to parts by weight unless otherwise expressly stated.

EXAMPLE I 192 g. of isobutylene, 4 g. of cyclopentadiene and 4 g. of isoprene were polymerized in a copper reactor equipped with a stainless steel stirrer and a nitrogen inlet tube. The above monomers were diluted with 3 volumes of methylchloride based on the volume of monomers. The reaction was carried out at −100° C. which was obtained by immersing the reactor in a liquid ethylene bath. A catalyst solution of 2.64 g. of aluminum chloride in one liter of methylchloride was introduced into the monomer solution in the reactor in a fine stream at a rate of 8.5 cc. of the solution per minute for 18 minutes. The rate of addition was controlled by a rotometer. The reaction was allowed to proceed to 93% conversion of the monomers and then quenched with 10 ml. of isopropyl alcohol. The reaction mixture was filtered to isolate the tripolymer product which was then dried in a vacuum. The composition of the feed, the percent conversion, the catalyst efficiencies, the mole percent unsaturation, and the intrinsic viscosity of the polymer product are given in Table I.

EXAMPLES II THROUGH IV

The process of Example I was carried out using the equipment and conditions of Example I with the feed, composition, percent conversion, catalyst efficiency and polymer properties given in Table I. Samples of the tripolymer of Examples I through IV were compounded on a rubber mill using the following formulation.

| Ingredients: | Parts |
|---|---|
| Tripolymer | 98.8 |
| Phenyl-beta-naphthylamine | 0.2 |
| Zinc Stearate | 1.0 |
| Carbon black | 50.0 |
| Zinc oxide | 5.0 |
| Sulfur | 1.0 |
| Thiuram disulfide | 1.2 |

The above mixtures were cured at 153° C. as micro test pads, one sample for 40 minutes and another sample at 120 minutes. Dumbbells were then cut from these pads of 20±2 mils in thickness and subjected to tensile strength and ozone resistance tests. In the ozone resistance test, the dumbbells were extended 50% and left in an atmosphere containing 0.2% ozone for 70 hours. The results of these tests are given in Table I.

EXAMPLES V AND VI

The process of Example I was carried out using 198 g. of isobutylene and 2 g. of isoprene in Example V and 194 g. of isobutylene and 6 g. of isoprene in Example VI to produce two samples of the isobutylene-isoprene copolymer known in the art as butyl rubber. The details of these runs are given in Table I for comparison purposes. Samples of these butyl rubbers were compounded on a rubber mill according to the formulation given above for Examples I through IV and the resulting cured samples subjected to tensile strength and ozone resistance tests as given above for the novel tripolymers of Examples I through IV. The results of these tests are given in Table I.

EXAMPLE VII

A copolymer of cyclopentadiene-isobutylene was prepared according to the process of Example I using 4 g. of cyclopentadiene and 196 g. of isobutylene in the feed. The above reaction became violent after 5 minutes and extreme reactor fouling resulted. The product was compounded on a rubber mill using the formulation and conditions given above and the cured polymer subjected to tensile strength and ozone resistance tests as shown above. The details of the process and the properties of the uncured and cured copolymer are given in Table I for comparison purposes.

having a mole percent unsaturation of 1.62 and an intrinsic viscosity of 2.14. The above polymer mixture was Table I

| Ex. | Monomer feed[1] | Conv., percent | Cat. eff. | Polymer properties | | Ozone exposure, hr. | 40 min. cure | | | 120 min. cure | | |
|---|---|---|---|---|---|---|---|---|---|---|---|---|
| | | | | Unsat., mole percent | Int. vis. | | 300% mod, p.s.i. | T.S., p.s.i. | Elong., percent | 300% mod, p.s.i. | T.S. p.s.i. | Elong., percent |
| I | E-2, B-2 | 93 | 460 | 3.58 | 1.55 | 0 | 715 | 2,955 | 710 | 715 | 2,360 | 720 |
| | | | | | | 70 | 605 | 1,400 | 510 | 630 | 1,870 | 635 |
| II | E-2, B-1 | 99 | 490 | 3.85 | 1.80 | 0 | 680 | 3,005 | 710 | 885 | 2,875 | 690 |
| | | | | | | 70 | 515 | 2,175 | 700 | 710 | 2,265 | 590 |
| III | E-3, B-1 | 99 | 380 | 4.01 | 1.56 | 0 | 640 | 2,900 | 780 | 855 | 2,795 | 680 |
| | | | | | | 70 | 595 | 2,525 | 725 | 840 | 2,090 | 540 |
| IV | E-5, B-1 | 100 | 285 | 6.85 | 1.29 | 0 | 595 | 1,900 | 800 | 820 | 1,705 | 650 |
| | | | | | | 70 | 525 | 1,805 | 805 | 730 | 1,570 | 630 |
| V | B-1 | 97 | 1,070 | 1.12 | 3.53 | 0 | 485 | 3,035 | 780 | 570 | 3,110 | 710 |
| | | | | | | 70 | Broke after 110 min. | | | Broke after 80 min. | | |
| VI | B-3 | 87 | 625 | 1.86 | 2.18 | 0 | 815 | 3,225 | 625 | 1,085 | 3,250 | 610 |
| | | | | | | 70 | Broke after 13½ min. | | | Broke after 15 min. | | |
| VII | E-2 | 100 | 1,200 | 1.87 | 3.09 | 0 | 230 | 1,145 | 1,170 | 455 | 1,605 | 930 |
| | | | | | | 70 | 180 | 750 | 1,445 | 355 | 1,310 | 980 |

[1] E and B numbers refer to weight percent of cyclopentadiene and isoprene respectively in the feed. The weight percent of isobutylene is equal to 100 minus (weight percent cyclopentadiene plus weight percent isoprene).

It can be seen from the above table that the novel tripolymers of the invention (Examples I through IV) have tensile strength properties after exposure to ozone far superior to those of both the butyl rubbers (Examples V and VI) and the isobutylene-cyclopentadiene copolymer of Example VII prepared in the absence of isoprene. Additionally, the reactions of Examples I through IV were carried out without the formation of gel and with excellent reaction control resulting in the absence of reactor fouling.

EXAMPLE VIII

A cyclopentadiene-isoprene-isobutylene tripolymer was prepared according to the process of Example I using 2 g. of cyclopentadiene and 2 g. of isoprene and 196 g. of isobutylene in the monomer feed. Reaction was carried out to 96% conversion, and a sample of the dried polymer was hot milled on a rubber mill at 149° C. for 10 minutes. One sample of the dried polymer was mixed with 0.2 wt. percent 2,2-methylene-bis(4-methyl-6-tertiary butyl phenol); another sample with 2.0 wt. percent of this phenol; and a third sample with 50 wt. percent with carbon black. Each sample was then hot milled at 149° C. for 10 minutes. The Mooney viscosities of these samples are given in Table II.

Table II

| Sample | Mooney vis. (8'/100°C.) | |
|---|---|---|
| | Original | Hot milled |
| Polymer | 79 | 35 |
| Polymer plus 0.2 weight percent 2,2-methylene-bis(4-methyl-6-tertiarybutyl phenol) | 79 | 45 |
| Polymer plus 2.0 weight percent 2,2-methylene bis(4-methyl-6-tertiarybutyl phenol) | 79 | 52 |
| Polymer plus 50 weight percent carbon black | 88 | 79 |

It can be seen from Table II that a marked decrease in Mooney viscosity is obtained by hot milling the cyclopentadiene-isoprene-isobutylene tripolymer of the invention. Reductions in Mooney viscosities were also obtained in the presence of phenol antioxidants but to a lesser degree. The presence of carbon black in the polymer inhibits this effect. However, when the antioxidant was incorporated before milling, i.e. in the slurry step, essentially no Mooney reduction was obtained.

EXAMPLE IX 5 parts by weight of the tripolymer of the invention containing 1,1, and 98 weight percent of cyclopentadiene, isoprene and isobutylene respectively was mixed with 95 parts by weight of a butyl rubber which is a copolymer of 97 wt. percent isobutylene and 3 wt. percent isoprene then hot milled for 10 minutes at 149° C. The Mooney viscosity of the blend is given in Table III together with the Mooney viscosities of the butyl rubber alone and the tripolymer alone for comparison purposes.

Table III

| Polymer | Mooney vis. (8'/100°C.) | |
|---|---|---|
| | Original | Hot milled |
| Butyl rubber | 79 | 69 |
| Tripolymer | 79 | 35 |
| Butyl rubber plus 5 parts by weight of tripolymer | 79 | 38 |

A marked decrease in Mooney viscosity can be noted for the butyl rubber-tripolymer blend compared to butyl rubber alone as shown in Table III.

EXAMPLE X

A cyclopentadiene-isoprene-isobutylene tripolymer was prepared according to the process of Example I except that 4 g. of cyclopentadiene, 2 g. of isoprene and 192 g. of isobutylene were used. The dried tripolymer obtained was then divided into samples and each sample stabilized with 0.2 wt. percent of the following antioxidants which were introduced by cold milling.

Sample:      Antioxidants
1 _____ Phenyl-beta-naphthylamine.
2 _____ N-lauroyl-p-aminophenol.
3 _____ 2,6-ditertiarybutyl-p-cresol.
4 _____ Dicyclohexylamine stearate.
5 _____ 2,2-Methylene-bis(4-methyl-6-tertiarybutyl phenol).
6 _____ None.

The above samples were then aged in air at 100° C. for various lengths of time as shown in Table IV. The intrinsic viscosities of the aged samples are given in Table IV.

Table IV

| Sample | Antioxidant | Intrinsic viscosity of heat aged polymer | | | |
|---|---|---|---|---|---|
| | | 0 days | 3 days | 7 days | 14 days |
| 1 | Phenyl-beta-naphthylamine | 1.86 | 1.54 | 1.56 | 1.36 |
| 2 | N-Lauroyl-p-aminophenol | 1.84 | 1.48 | 1.42 | 1.34 |
| 3 | 2,6-ditertiarybutyl-p-cresol | 1.99 | 2.06 | 1.60 | 1.38 |
| 4 | Dicyclohexylamine stearate | 1.81 | 0.86 | 1.10 | 0.71 |
| 5 | 2,2-Methylene-bis(4-methyl-6-tertiarybutyl phenol) | 1.77 | 1.68 | 1.70 | 1.65 |
| 6 | None | 1.64 | 1.12 | 0.80 | 0.41 |

It can be seen from the above table that most of the antioxidants tested were quite effective as stabilizers. The antioxidant of sample 5, 2,2-methylene-bis(4-methyl-6-tertiarybutyl phenol) was particularly effective. It was also found that these antioxidants were effective in the vulcanizates as well as in the above unvulcanized polymer samples.

Samples of the tripolymer of Example III were blended with various quantities of one of two butyl rubbers; either Butyl 035 which has a Mooney viscosity of 38 to 47 and a mole percent unsaturation of 0.6 to 1.0, or Butyl 268 which has a Mooney viscosity of 71 to 80 and a mole percent unsaturation of 1.5 to 2.0. The blends were then cured at 307° F. for different periods of time. Dumbbells 20±2 mils in thickness were cut from the vulcanized blends and subjected to tensile strength and ozone resistance tests. In the ozone resistance test, the dumbells were extended 50% and left in an atmosphere containing 0.2% ozone for 72 hours. The compositions of the blends, the curing times, and the results of the above tests are given in Table V.

Table V

|  | 1 | 2 | 3 | 4 | 5 | 6 | 7 |
|---|---|---|---|---|---|---|---|
| Polymer blend, parts by wt.: |  |  |  |  |  |  |  |
| Tripolymer | 100 |  | 10 | 25 | 50 |  | 50 |
| Butyl 268 |  | 100 | 90 | 75 | 50 |  |  |
| Butyl 035 |  |  |  |  |  | 100 | 50 |
| Press cures at 153° C.: |  |  |  |  |  |  |  |
| 15 min. cures: |  |  |  |  |  |  |  |
| Mod., p.s.i./300% | 450 | 515 | 550 | 510 | 445 | 265 | 315 |
| Tensile, p.s.i | 2,140 | 3,165 | 3,175 | 3,105 | 2,775 | 2,280 | 2,300 |
| Elongation, percent | 855 | 740 | 730 | 810 | 905 | 925 | 915 |
| After 72 hrs. ozone exposure: |  |  |  |  |  |  |  |
| Mod., p.s.i./300% |  |  |  |  | 455 |  | 345 |
| Tensile, p.s.i |  |  |  |  | 1,520 |  | 1,834 |
| Elongation, percent |  |  |  |  | 640 |  | 765 |
| Ozone break, hrs |  | 0.38 | 0.84 | 5.27 |  | 1.05 |  |
| 40 min. cures: |  |  |  |  |  |  |  |
| Mod., p.s.i./300% | 700 | 970 | 1,010 | 785 | 710 | 460 | 590 |
| Tensile, p.s.i | 2,175 | 3,415 | 3,290 | 3,285 | 2,965 | 2,760 | 2,725 |
| Elongation, percent | 620 | 640 | 635 | 705 | 700 | 770 | 775 |
| After 72 hrs. ozone exposure: |  |  |  |  |  |  |  |
| Mod., p.s.i./300% | 650 |  |  |  | 640 |  | 585 |
| Tensile, p.s.i | 1,715 |  |  |  | 910 |  | 1,395 |
| Elongation, percent | 575 |  |  |  | 400 |  | 525 |
| Ozone break, hrs |  | 0.42 | 0.76 | 2.69 |  | 1.16 |  |
| 120 min. cures: |  |  |  |  |  |  |  |
| Mod., p.s.i./300% | 925 | 1,045 | 1,175 | 910 | 925 | 640 | 730 |
| Tensile, p.s.i | 2,175 | 3,340 | 3,345 | 3,245 | 2,965 | 2,715 | 2,425 |
| Elongation, percent | 570 | 615 | 590 | 630 | 665 | 685 | 635 |
| After 72 hrs. ozone exposure: |  |  |  |  |  |  |  |
| Mod., p.s.i./300% | 950 |  |  |  |  |  |  |
| Tensile, p.s.i | 1,965 |  |  |  |  |  |  |
| Elongation, percent | 535 |  |  |  |  |  |  |
| Ozone break, hrs |  | 0.32 | 0.50 | 2.20 | 30.5 | 0.47 | 44.0 |

It can be seen from the above table that the ozone resistances of the blends of the invention are much greater than those of the butyl rubber samples alone.

The invention is not limited to the examples which are given by way of illustration purposes only. Also modification of the process will occur to those skilled in the art without departing from the spirit and scope of the invention.

What is claimed is:

1. The process for preparing a solid plastic hydrocarbon tripolymer of isobutylene, a cyclodiene and isoprene comprising the steps of mixing together (a) from 0.1 to 25 parts by weight of a cyclodiene having from 5 to 8 carbon atoms and two conjugated double bonds in a ring structure consisting of 5 to 6 carbon atoms, (b) 0.1 to 25 parts by weight of isoprene and (c) 99.8 to 50 parts by weight of isobutylene; cooling the mixture to a polymerization temperature between −150° C. and +50° C.; adding to the cooled mixture a solution of an active Friedel-Crafts halide catalyst in an organic solvent which is liquid at the polymerization temperature and which does not form a complex with the catalyst to obtain a polymerization reaction; and isolating an isobutylene-cyclodiene-isoprene tripolymer therefrom.

2. The process of claim 1 wherein the reaction is carried out to a conversion of from 30 to 100%.

3. The process of claim 1 wherein from 0.2 to 5 parts of a cyclodiene, from 0.5 to 5 parts of isoprene and from 99.4 to 90 parts of isobutylene are employed.

4. The process of claim 1 wherein the temperature is maintained in the range of −50 to −100° C.

5. The process of claim 4 wherein the Friedel-Crafts halide catalyst is a solution of aluminum chloride in an alkyl chloride having 1 to 2 carbon atoms.

6. A synthetic solid plastic hydrocarbon tripolymer of a major proportion by weight of isobutylene and minor proportions of (a) a cyclodiene having from 5 to 8 carbon atoms and two conjugated double bonds in a ring structure consisting of 5 to 6 carbon atoms and (b) isoprene.

7. The tripolymer of claim 6 wherein the cyclodiene is cyclopentadiene.

8. The vulcanized tripolymer of claim 6, the vulcanization being carried out with a vulcanizing agent selected from the group consisting of sulfur, p-quinone dioxime and a dinitroso compound.

9. A composition of matter comprising the tripolymer of claim 6 and an antioxidant selected from the group consisting of phenyl-beta-naphthylamine, N-lauroyl-p-aminophenol, 2,6-ditertiarybutyl-p-cresol, dicyclohexylamine stearate, and 2,2-methylene-bis(4-methyl-6-tertiarybutyl phenol).

10. The tripolymer of claim 6 which has been heat plasticized by hot milling at temperatures in the range of 100 to 400° F.

11. A process for reducing the Mooney viscosity of butyl rubber, a copolymer of isobutylene and a conjugated diolefin, comprising the steps of mixing butyl rubber with from 1 to 25 parts by weight of the tripolymer of claim 6; and milling the resulting mixture at a temperature of 38 to 205° C. for from 1 to 30 minutes.

12. A composition of matter comprising butyl rubber and the tripolymer of claim 6.

13. The composition of claim 12 which contains from 1 to 50 wt. percent tripolymer.

References Cited in the file of this patent

UNITED STATES PATENTS

| 2,521,359 | Garber | Sept. 5, 1950 |
| 2,577,822 | Sparks | Dec. 11, 1951 |
| 2,730,515 | McCracken et al. | Jan. 10, 1956 |
| 2,739,141 | Ernst | Mar. 20, 1956 |

FOREIGN PATENTS

| 1,073,666 | France | Sept. 28, 1954 |